United States Patent

[11] 3,593,991

| [72] | Inventors | Herschel Baron, Philadelphia, Pa.; Arthur Schwenk, Gibbsboro, N.J.; Michael L. Wajda, Philadelphia; Herbert V. Jacobs, Lower Merion, both of Pa. |
|---|---|---|
| [21] | Appl. No. | 736,629 |
| [22] | Filed | June 13, 1968 |
| [45] | Patented | July 20, 1971 |
| [73] | Assignee | Jacobs Machine Corporation Philadelphia, Pa. |

[54] STACKER
7 Claims, 14 Drawing Figs.

[52] U.S. Cl. ............................................. 271/70, 112/121.29, 271/83
[51] Int. Cl. ....................................... B65h 29/38, D05b 81/00
[50] Field of Search ........................... 112/121.29; 211/1.5, 163; 271/70, 71, 74, 76, 86, 83; 74/527; 77/64

[56] References Cited
UNITED STATES PATENTS

| 1,479,346 | 1/1924 | Wegner | 271/83 |
| 3,314,675 | 4/1967 | Rothfuss et al. | 271/71 X |
| 847,297 | 3/1907 | Stambaugh | 77/64 |
| 2,394,769 | 2/1946 | Heckethorn | 77/64 |
| 2,538,972 | 1/1951 | Magnani | 271/74 X |
| 2,884,244 | 4/1959 | Bowman | 271/86 |
| 2,915,308 | 12/1959 | Matzen | 271/74 X |
| 2,918,177 | 12/1959 | Nelson et al. | 211/163 |
| 3,204,590 | 9/1965 | Rockerath et al. | 112/121.29 X |

Primary Examiner—Richard E. Aegerter
Assistant Examiner—W. Scott Carson
Attorney—Caesar, Rivise, Bernstein & Cohen ABSTRACT: A stacker for flexible articles that are successively presented to an output station. The stacker comprises a support member for flexible articles and a movable member for transporting the articles from the output station to the support member. The movable member has means for producing suction. The suction means acts to secure the articles to the movable member as the movable member transports the articles from the output station to the support member.

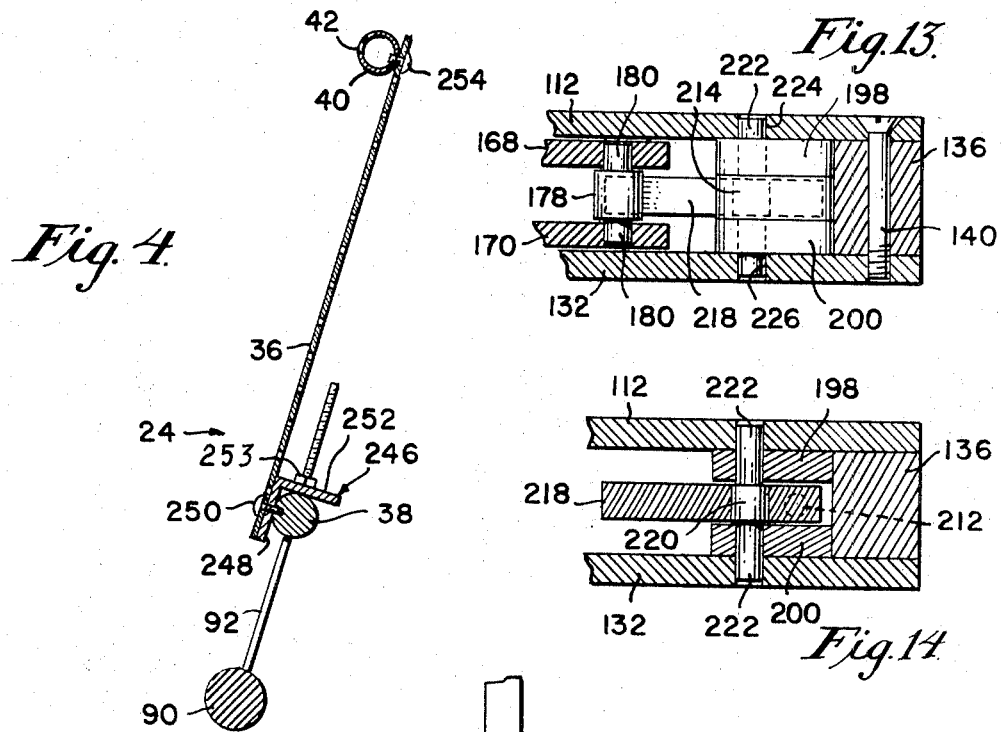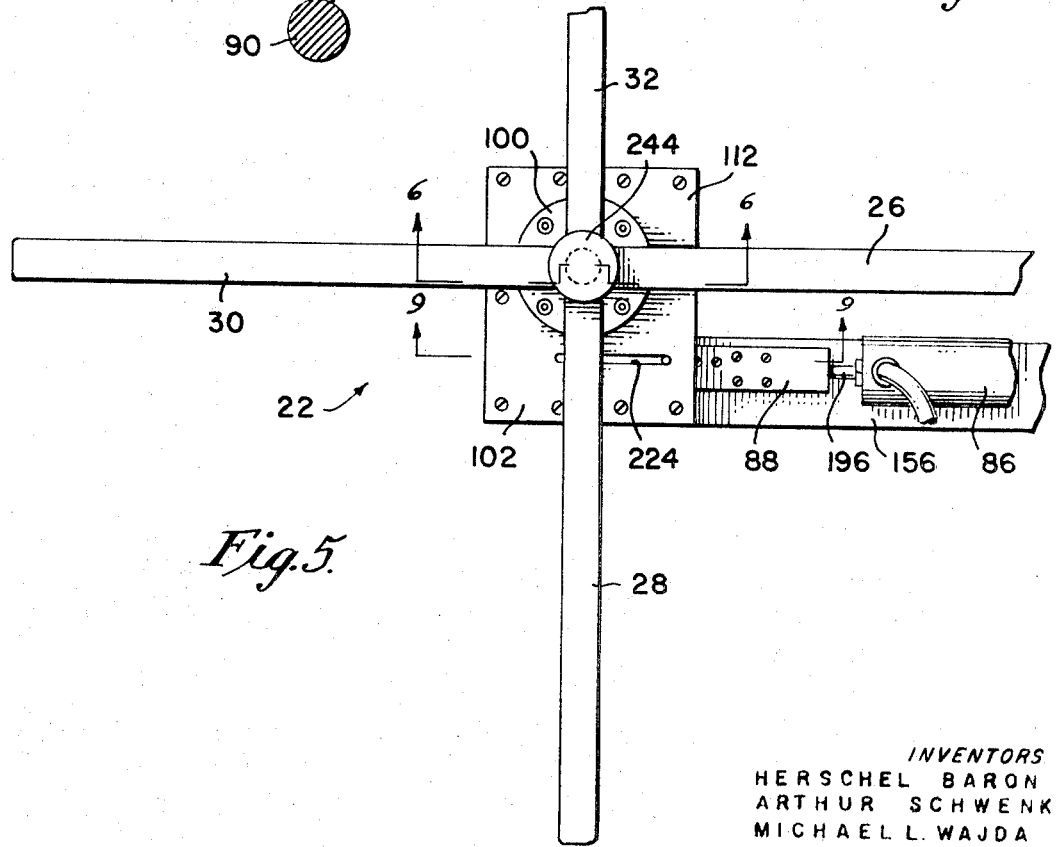

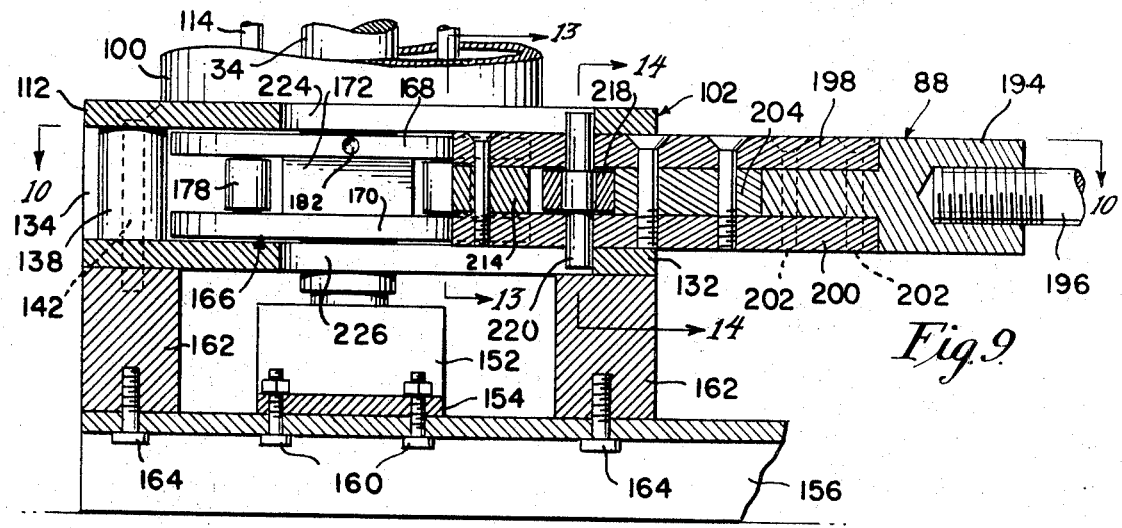
Fig.9
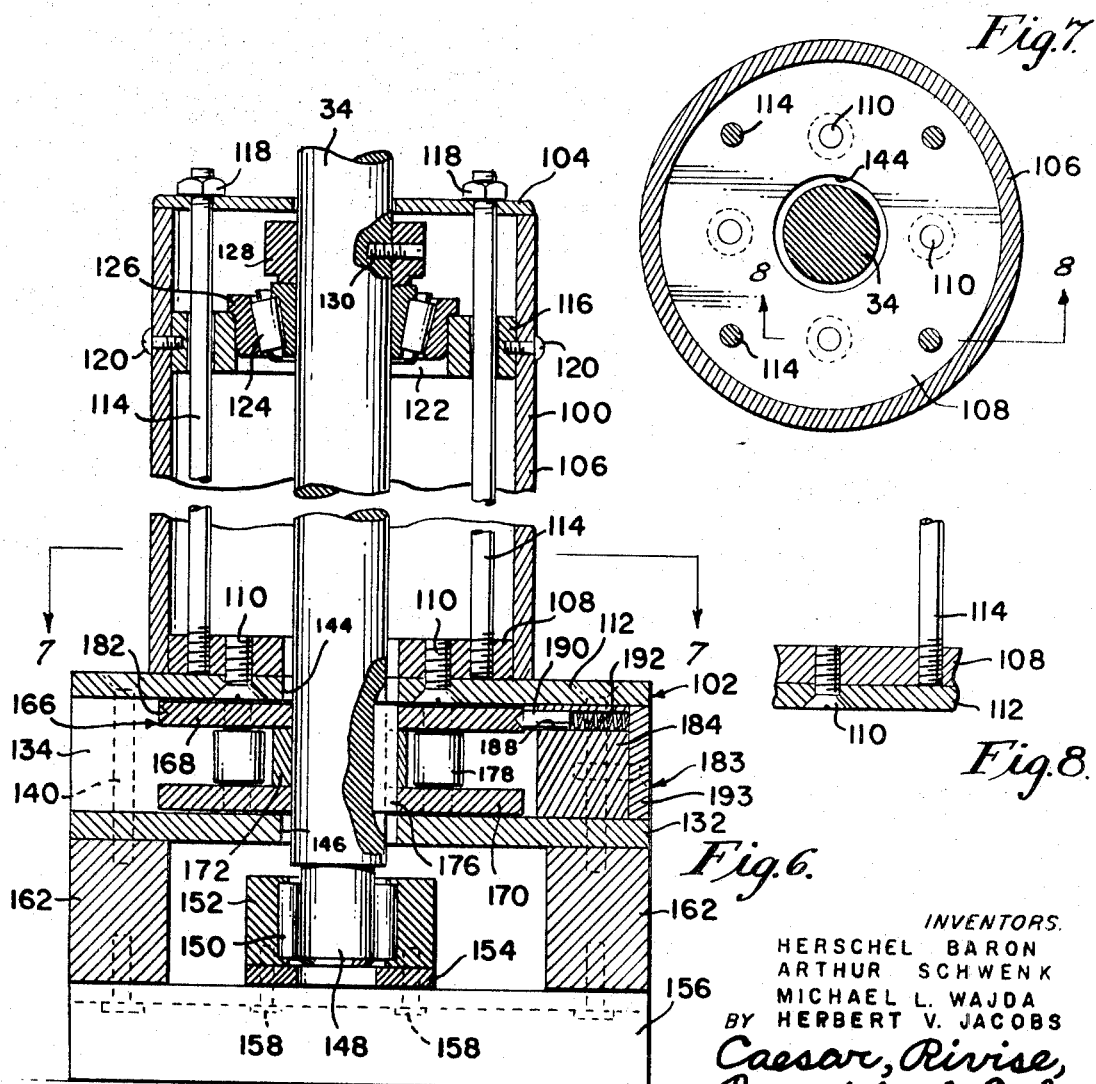
Fig.7
Fig.8
Fig.6
INVENTORS.
HERSCHEL BARON
ARTHUR SCHWENK
MICHAEL L. WAJDA
BY HERBERT V. JACOBS
Caesar, Rivise,
Bernstein & Cohen
ATTORNEYS

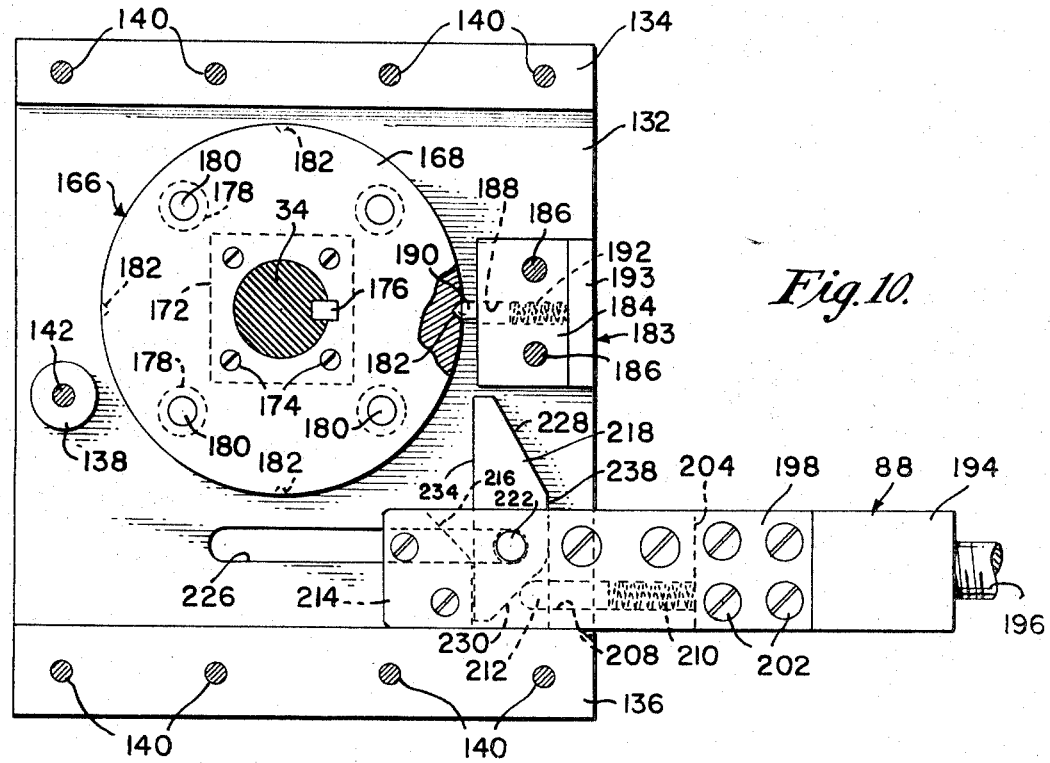
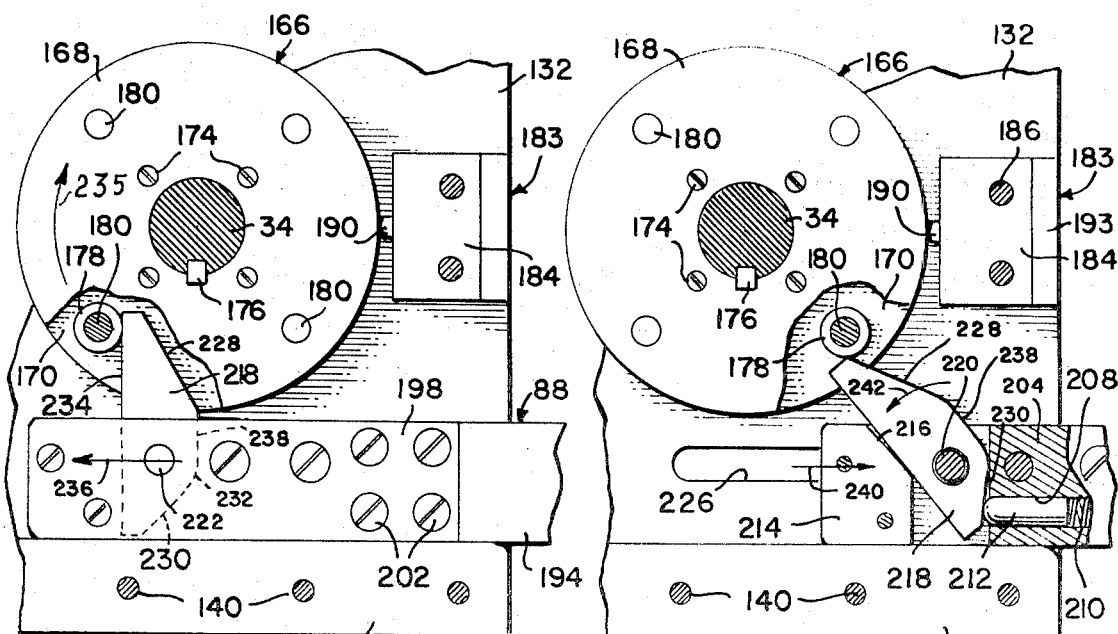

3,593,991

1

STACKER

This invention relates generally to the output portion of an automatic production device and more particularly to a stacker for flexible articles produced in successive order by an automatic sewing assembly.

In most conventional production facilities for flexible articles, as each article is produced, an operator is required to manually take the article and pile it on a supporting device until a completed bundle is produced having a predetermined number of articles therein. The bundle is then removed and the next bundle is made. Various automatic stacking devices have been suggested. They have, however, proven to have disadvantages. One problem is that bundles produced by the automatic stacking device are not neat or uniform. Therefore, an operator must be provided to align each of the articles in the bundle prior to use in another operation. Moreover, after a bundle has been completed, an operator must be provided to remove the bundle so that there will be room to assemble the next bundle. Where an operator is not provided, the bundles are intermingled or the machine must be stopped after each bundle is completed and remain stopped until the bundle which is completed is removed.

It is therefore an object of the invention to overcome the aforementioned disadvantages.

Another object of the invention is to provide a new and improved stacker for flexible articles.

Another object of the invention is to provide a new and improved stacker which is both efficient and inexpensive.

Another object of the invention is to provide a new and improved stacker which enables continuous operation of an automatic sewing assembly producing successive flexible articles.

Yet another object of the invention is to provide a new and improved stacker for flexible articles which is space saving.

Still another object of the invention is to provide a new and improved stacker for flexible articles which piles articles into neat bundles and which enables storage of a plurality of bundles while a new bundle is being completed.

These and other objects of the invention are achieved by providing a stacker for flexible articles which are successively presented to an output station. The stacker comprises a support member for the articles and a movable member for transporting the articles from the station to the support member. The movable member has means for producing suction. The suction means acts to secure the articles to the movable member as the movable member transports the articles.

Other objects and many of the attendant advantages of this invention will be readily appreciated as the same becomes better understood by reference to the following detailed description when considered in connection with the accompanying drawings wherein:

FIG. 4 is an enlarged sectional view taken along the line 4-4 in FIG. 2;

FIG. 5 is an enlarged top plan view taken along the line 5-5 in FIG. 3;

FIG. 6 is an enlarged sectional view taken along the line 6-6 in FIG. 5;

FIG. 7 is a sectional view taken along the line 7-7 in FIG. 6;

FIG. 8 is a sectional view taken along the line 8-8 in FIG. 7;

FIG. 9 is an enlarged sectional view taken along the line 9-9 in FIG. 5;

FIG. 10 is a sectional view taken along the line 10-10 in FIG. 9;

FIG. 11 is a sectional view similar to the view taken in FIG. 10 showing the ram being moved to its innermost position with parts removed for purposes of clarity;

2

FIG. 12 is a sectional view similar to the view taken in FIG. 10 showing the ram being moved from its innermost to its outermost position with parts removed for purposes of clarity;

FIG. 13 is a sectional view taken along the line 13-13 in FIG. 9; and

FIG. 14 is a sectional view taken along the line 14-14 in FIG. 9.

Figure 1:
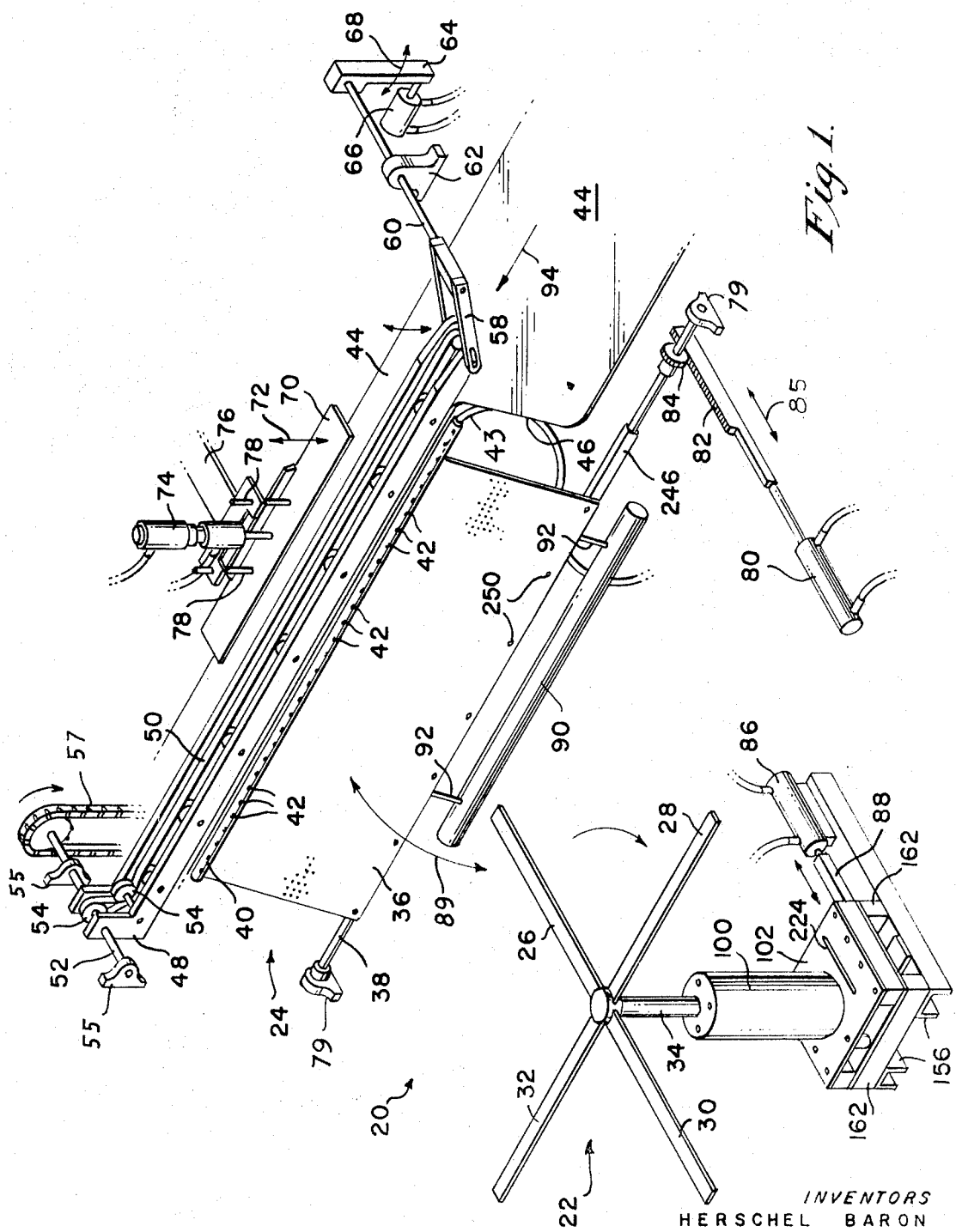
FIG. 1 is a perspective view of the stacker embodying the invention with portions removed for purposes of clarity.

Referring now in greater detail to the various figures of the drawing wherein similar reference characters refer to similar parts, a stacker embodying the invention for an automatic sewing assembly is shown generally at 20 in FIG. 1.

The stacker basically comprises a support member or turnstile 22 and a pivotably movable member or doffing gate 24. The turnstile 22 includes a plurality of arms 26, 28, 30 and 32, each of which acts to support a bundle of flexible articles such as shirt fronts. The arms are secured to and extend radially from a vertically extending shaft 34 and are angularly spaced 90° from each other about the periphery of shaft 34. The arms 26 to 32 each extend horizontally and are secured at the uppermost portion of shaft 34. Shaft 34 is adapted to be rotated 90° after each bundle of articles is completed.

The doffing gate 24 basically comprises a perforated plate or rigid planar screen 36 which is elongated and which is operatively secured to a pivotable shaft 38. Secured along the outermost longitudinal edge of the screen 36 is a tube 40 having a plurality of openings 42 along the length thereof. The tube 40 is connected to a source of reduced pressure via pipe 43 to enable a sucking action through the openings in the tube. Pipe 43 includes conventional valve means (not seen) for selectively connecting the tube 40 to the source of reduced pressure.

The doffing gate 24 is disposed adjacent the deck of an automatic sewing assembly at the output station thereof. The deck 44 includes an open area 46 in which the doffing gate 24 is disposed. Mounted adjacent the open area 46 of the deck is a housing 48 for a transport belt 50. The transport belt 50 is provided in the automatic sewing assembly to draw articles to be sewn to the sewing heads of the automatic sewing assembly. The housing 48 for the transport belt is pivotably mounted about drive shaft 52 which is operatively connected to the transport belt 50 via a series of pulleys or sprockets 54. The shaft 52 is rotatably supported by mounting brackets 55 and is connected via a sprocket wheel and chain 57 to a motive source.

A lift lever 58 is pivotally secured to the belt housing 48 at the opposite end thereof. Lift lever 58 is secured at its other end to a pivotable shaft 60 which is supported by a mounting bracket 62. Shaft 60 is secured at its other end to a crank lever 64. Shaft 60 is rotatably mounted in supporting bracket 62 and pivots with both the lever 58 and crank lever 64.

The crank lever 64 is secured to the piston rod of solenoid-operated air cylinder 66. Crank lever 64 is rotatable with shaft 60 in the direction of arrows 68. When the solenoid of air cylinder 66 is energized, the crank lever 64 is drawn in a clockwise direction as seen in FIG. 1 thereby causing shaft 60 and lift lever 58 to rotate in a clockwise direction also. The rotation of lever 58 in a clockwise direction lifts the belt housing 48 which frees an article therebeneath.

Adjacent the belt housing 50, there is provided a sewing clamp 70 which is planar and disposed in a horizontal plane. The clamp 70 is vertically movable in the direction of arrows 72. A solenoid-operated air cylinder 74 is operatively connected to the clamp 70 to selectively control the movement thereof. A Y-shaped guide 76 is mounted above the clamp 70 having openings provided therein for guiding a pair of guideposts 78 which are secured to the clamp 70 to maintain vertical alignment as the clamp is moved in a vertical direction.

Shaft 38 of doffing gate 24 is rotatably supported by a pair of supporting brackets 79. The doffing gate 24 is controlled by a solenoid-operated air cylinder 80, the piston rod of which is connected to a transversely extending rack 82 which is operatively connected to a pinion 84. The pinion 84 is mounted on the end of shaft 38 and are both caused to rotate by the transverse movement of the rack 82 in the direction of arrows 85.

The turnstile 22 is controlled by a solenoid-operated air cylinder 86, the piston rod of which is secured to a ram 88 which causes a 90° rotation of the turnstile 22 each time the cylinder 86 is energized. As will hereinafter be seen, the ram 88 is connected via indexing means to shaft 34 of the turnstile to cause a 90° rotation thereof each time ram 88 is moved inwardly of turnstile 22.

A counterweight 90 is also provided on doffing gate 24. Counterweight 90 is secured via a pair of elongated bolts 92 to the shaft 38. The counterweight 90 is provided to provide a counterbalance on the opposite side of the shaft 38 when an article is transported by the doffing gate 24 from the output station of deck 44 to the turnstile 22.

In operation, the automatic sewing assembly provides an article to be sewn on the deck 44 and urges it to the belt housing 48 in the direction of arrow 94. As the article is moved by the transport belt 50, a portion of the article falls or drapes over screen 36 of the doffing gate which is positioned in the opening 46 of the deck adjacent the belt housing 48 and the output station of the deck. The belt housing 48 is disposed at its lowermost position so that the belt 50 is capable of drawing the article to be sewn beneath the sewing clamp 70. When the belt has moved the article to the position at which it is sewn, the clamp 70 is lowered to keep the article stationary while it is sewn.

When the final sewing operation is preformed on the article, the sewing clamp 70 is lowered again to the lowermost position against the article so that it can be sewn. The belt housing 48 is then lifted up by the actuation of cylinder 66 which draws the crank lever 64 in a clockwise direction which also causes lever 58 to be drawn in a clockwise direction. The housing 48 is thus lifted up to prevent the housing 48 from holding the article to the deck.

At the same time that the housing 50 is lifted, reduced pressure is applied to the tube 40 via pipe 43 which causes air to be sucked into openings 42. The article which is being sewn is partially draped over the screen 36 and is caused by the sucking action through the openings 42 of the tube to be drawn against the screen 36. As the last sewing operation is completed, the sewing clamp 70 is lifted upwardly and substantially simultaneously the solenoid 80 is actuated to cause rotation of the doffing gate 24 in the counterclockwise direction of arrows 89 shown in FIG. 1. The article is transported by the doffing gate 24 to the turnstile and draped over the arm 26 which faces or extends towards the doffing gate.

When the doffing gate is in its lowermost position closest to the arm of turnstile 22, the vacuum supply is turned off so that atmospheric pressure is restored to the tube 40 thereby preventing further sucking through the openings 42. The garment is thus released and as the doffing gate 24 is rotated to its clockwisemost position, the article remains on the arm 26 of the turnstile 22. It should also be noted that as the article clears the belt housing 50, the cylinder 66 is actuated in the opposite direction to cause the crank lever 68 to be drawn in a counterclockwise direction causing the lift lever 58 to follow and thereby lower the housing 48 to enable belt 50 to draw the next article to the sewing head of the automatic sewing assembly.

After the next article is in its final position in the output station and clamp 70 lowered for the last time, the housing 50 is raised, the tube 40 has applied thereto vacuum pressure. The doffing gate 24 is again actuated after sewing clamp 70 is raised. The actuation of solenoid 80 causes the doffing gate 24 to be rotated in a counterclockwise direction causing the second article to be draped over the arm 26. This procedure is iterative and each article which is produced by the automatic sewing assembly is transported by the doffing gate and draped over arm 26 until the final article of a batch is placed on the arm. After the batch has been completed, solenoid 86 is actuated causing ram 88 to rotate the turnstile 22 90°. This causes the arm 32 to face the screen 36 of the doffing gate 24. The next batch of articles is then draped over arm 32 until the next batch is completed. At that point, solenoid 86 is actuated thereby causing the turnstile 22 to be rotated 90°. The next batch is then proceeded with and draped over arm 30 of the turnstile. After the third batch is completed, the turnstile 22 is rotated again and the arm 28 is then used to support the next batch.

It should be noted that as each batch is produced, the remaining arms are free to be unloaded by an operator. Thus, an operator is given the opportunity to remove as many as three batches of articles while the fourth arm is holding the batch which is presently being completed.

After the fourth arm 28 has been loaded, the arm 26 is again facing the doffing gate 24 and the cycle then repeats for the next four batches that are produced. That is, the operation is continuous. The arms are interchangeable and after the last batch has been produced, the arm holding the last bundle is rotated 90° so that a free arm is available for the next batch that is produced in the next sequence of operations of the automatic sewing assembly.

The provision of the suction means or tube 40 enables a positive securement of the article to the doffing gate as it is transported from the output station of the automatic sewing assembly to the turnstile. Moreover, the suction means facilitates alignment of the articles in each batch in that the doffing gate delivers the same portion of each article to the same position on the turnstile since the suction means prevents movement of the flexible article relative to the doffing gate.

The use of turnstile 22 is space saving. Since the flexible articles are draped over the arms of the turnstile, a large planar deck is not required to support the batches.

As best seen in FIGS. 5 and 6, the turnstile 22 basically comprises in addition to arms 26, 28, 30 and 32 and shaft 34, a vertically extending cylindrical housing 100 and a generally rectangular base 102. The housing 100 includes a circular top plate 104, a cylindrical wall 106 and a circular centering plate 108.

As best seen in FIGS. 6 and 7, centering plate 108 is secured by a plurality of threaded fasteners 110 to a top box plate 112 of base 102. The cylindrical housing 100 is centered and secured to the top wall 112 of base 102 by four threaded rods 114 which extend through plate 104 and openings provided in a mounting block 116, and are threadedly secured in openings provided in the centering plate 108. Nuts 118 are threadedly secured to the uppermost portion of each of the rods abutting the top surface of top plate 104 to secure the plate 104 to the wall 106 of the circular housing 100.

The mounting block 116 is secured within wall 106 by a plurality of threaded fasteners 120 which extend through wall 100 into the body of the block 116. Block 116 is circular and is disposed adjacent the uppermost portion of the housing 100 and includes a circular opening 122 at the central portion thereof. Opening 122 extends vertically and a tapered roller bearing 124 is mounted therein. The outer cup of the roller bearing 124 includes an annular laterally extending flange 126 which is disposed about the upper edge thereof and acts as a shoulder when the bearing is placed in opening 122. The inner portion of the roller bearing 124 or the cone is embracingly fitted about the shaft 34. A collar 128 is secured about the shaft 34 adjacent the cone of the roller bearing 124 and is secured to the shaft 34 by a threaded fastener 130 which abuts the periphery of shaft 34. The collar 128 rests on the cone portion of the roller bearing 124 and prevents vertical slipping of the shaft 34 with respect to the bearing.

As best seen in FIG. 8, the base 102 further includes a bottom box plate 132 which is generally planar and rectangular and substantially equal in size to the top box plate 112.

As best seen in FIG. 10, a pair of elongates spacing blocks 134 and 136 are provided along and between the longitudinal edges of the plates 112 and 132. A cylindrical spacer 138 is provided at the center of the plates. The blocks 134 and 136 are secured between the plates 112 and 132 by threaded fasteners 140. As best seen in FIG. 6, the cylindrical spacer 138 is secured between the box plates 112 and 132 by a threaded fastener 142.

The box plates 112 and 132 each include vertically extending openings 144 and 146 which are vertically aligned with respect to each other through which shaft 34 extends. The bottommost portion of the shaft 34 is shouldered at 148. The portion 148 of the shaft extends into a needle bearing 150 which is secured in a bearing block 152. Shaft 34 is thus rotatable in bearing block 152. The bearing block maintains the shaft 34 in a vertical disposition. The bearing block 152 rests on a pad or plate 154 which extends transversely and which is supported by a pair of U-shaped channels 156 upon which the base 102 rests. The bearing block 152 is secured to the pad 154 by threaded fasteners 158. An opening 160 is provided at the center of the pad 154 beneath the end portion 148 of shaft 34 for access thereto. The opening 160 is smaller than the needle bearing 150 so that the needle bearing cannot slip through the same.

As best seen in FIG. 9, the pad 154 is secured to the rails 156 by threaded fasteners 160. The rails 156 are spaced from the bottom box plate 132 by a pair of transversely extending blocks 162. The blocks 162 are secured to the rails 156 by threaded fasteners 164. The fasteners 142 and 140 which are used to secure the spacer blocks between the box plates 112 and 132 also act to secure the base 102 to the blocks 162.

As best seen in FIGS. 6 and 10, an index wheel 166 is provided between the box plates 112 and 132. The index wheel 166 basically comprises a circular top plate 168 and bottom plate 170 which are secured to and spaced by a substantially square block 172. The plates 168 and 170 are secured to the block 172 by threaded fasteners 174. The top and bottom plates 168 and 170 and the block 172 are keyed to the shaft 34 by a rectangular elongated key 176 which extends vertically within a keyway provided in the shaft 34 and a keyway provided in the plates 168 and 170 and the block 172. The index wheel 166 thus rotates with the shaft 34. Provided between the bottom and top plates are four rollers 178 which are spaced angularly 90° from each other about and equally spaced radially from the shaft 34. The rollers 178 have reduced ends 180 which are rotatably secured in bearings provided in the top and bottom plates 168 and 170, respectively.

As best seen in FIG. 10, the top plate 168 of the index wheel includes four conically shaped detent recesses 182 in the peripheral surface thereof. These detents 182 are angularly spaced 90° apart about the periphery and are so located with respect to rollers 178 to enable rotation of the wheel in increments of 90°.

A detent spring and block assembly 183 is mounted between plates 112 and 132 of the base 102. The assembly basically comprises a block 184 which extends vertically and is secured between plates 132 and 112 by threaded fasteners 186. A transversely extending bore 188 is provided in block 184 to house a detent pin 190 and a spring 192. A backing plate 193 is provided adjacent to block 184 to maintain the spring 192 and detent pin 190 within the opening 188.

As best seen in FIG. 10, the detent pin 190 is urged by spring 192 against the periphery of the top plate 168 of the index wheel 166. In order to turn the index wheel 166, it is necessary to overcome the spring 192 which urges the detent pin 190 into the detent 182 of the top plate 168 of the index wheel. The end of pin 190 is tapered so that it is urged out of a detent when a sufficient torque is provided to the index wheel.

Also mounted between the box plates 112 and 132 is ram 88. As best seen in FIG. 10, the ram 88 includes a first block 194 which is secured to piston rod 196 of solenoid 86. Block 194 is generally rectangular and has a reduced extension 196 which projects forwardly as best seen in FIG. 9. A pair of rectangular plates 198 and 200 are secured to the projection 196 of the block 194 by a plurality of threaded fasteners 202. A second block 204 is provided adjacent the projection 196 between plates 198 and 200.

Block 204 is secured between plates 198 and 200 by a pair of threaded fasteners 206. The block 204, as best seen in FIG. 10, includes a longitudinally extending opening 208. The opening 208 acts as a housing for a spring 210 and a plunger pin 212. A third block 214 is also provided between the plates 198 and 200 at the forwardmost end thereof.

Block 214 is generally rectangular and includes an inclined surface 216 at its rearmost lateral surface. A tongue 218 is mounted between the plates 198 and 200 and blocks 204 and 214. Tongue 218 is pivotably secured about a pin 220 which has a pair of reduced ends 222 which are rotatably mounted in openings provided therefor in plates 198 and 200.

As best seen in FIGS. 9 and 13, ends 22 of pin 220 extend through the plates 198 and 200 into a pair of horizontally extending slots 224 and 226 which are provided respectively in bottom plates 112 and 132. Ends 222 thus ride in the slots 224 and 226 to guide the entire ram assembly 88 when it is moved by rod 196. Slots 224 and 226 also further act to limit the extent of the movement of the ram 88.

The tongue 218 in ram 88 is best seen in FIGS. 10, 11 and 12. The tongue is basically comprised of a generally rectangular planar plate having an inclined lateral edge 228 and an inclined edge 230 having a rounded portion 232 adjacent its rearmost surface. The tongue 218 is pivotable about the roller 220 and is urged by the plunger pin 212 to the position shown in FIGS. 10 and 11. Thus, when solenoid 86 has not been energized and the ram 88 is in its outermost or rightmost position as seen in FIG. 10, the tongue 218 is in the position shown in FIG. 10 with the forwardmost lateral surface 234 thereof extending transversely to the slots 224 and 226.

When solenoid 86 is energized, the ram 88 is urged in the direction of arrow 236 shown in FIG. 11. The ram is moved parallel to slots 226 which act to guide the ram.

The movement of the ram causes the forwardmost surface 234 of the tongue 218 to abut roller 178 which causes the index wheel 166 to rotate in the direction of arrow 235 (FIG. 11). That is, the roller 178 which is at the right-hand bottom corner as shown in FIG. 10 imparts torque to index wheel 166 which causes the index wheel to rotate. As best seen in FIG. 11, the tongue 218 causes the index wheel to rotate 90° since the end of slots 224 and 226 limit the inward movement of ram 88. The abutment of block 214 by the forwardmost surface 234 of the tongue and the rearmost surface or edge 238 of the tongue 218 bearing against block 204 prevent the rotation of the tongue 218 when moved in the direction of arrow 236. Thus, as the tongue is moved from right to left as shown in FIGS. 10 and 11 in the direction of arrow 236, the forwardmost edge 234 remains transverse to the slots 224 and 226 and thereby enables the movement of the roller 178, which is abutted thereby, 90° about the shaft 34. The slot 226 limits this motion to assure that the index wheel is moved only 90°.

As the roller 178 is first contacted by the tongue 218, the torque applied to index wheel 166 is great enough to enable the pin 190 to be urged out of the detent 182 and thereby enable the index wheel to be rotated. As the ram 88 is moved to its innermost extent, the pin 190 is urged into the next detent 182 which thereby enables holding of the index wheel 166 in place exactly 90° removed from its previous position.

As the ram 88 is drawn outwardly by the solenoid 86, the ram 88 is moved in the direction of arrow 240 in FIG. 12. As the ram returns to its original position as shown in FIG. 10, the tongue 218 abuts the next roller 178. As best seen in FIG. 12, the inclined edge 228 of the tongue 218 rolls along the roller 178 thereby causing the tongue 218 to be rotated in the direction of arrow 242. The inclined edge 216 of block 214 enables the tongue 218 to be rotated enough to clear the roller 178.

It should be noted that spring 192 which causes the thrust pin 190 to be urged in the detent 182 of the index wheel 166 is a stronger or heavier spring than the spring which urges pin 212 against the tongue 218. Thus, as the inclined edge 228 of tongue 218 is urged against roller 178 upon withdrawal of the ram, the index wheel is prevented from movement since the spring 192 is stronger than the spring which urges pin 212 against the surface 230 of tongue 218. Therefore, tongue 218 rotates before the index wheel is forced to be pivoted rearwardly or counterclockwise as shown in FIGS. 10, 11 and 12.

The arms 26 through 32, which are secured to the uppermost end of the shaft, are thus rotated 90° each time the ram 88 is moved inwardly of housing 102 to rotate the index wheel 90°. The arms 26 through 32 are secured to the top of shaft 34 by a circular bracket 244. Bracket 244 is secured by suitable fasteners to the uppermost end of the shaft and prevents movement of the arms 26 through 32 with respect to the shaft 34.

Figure 3:
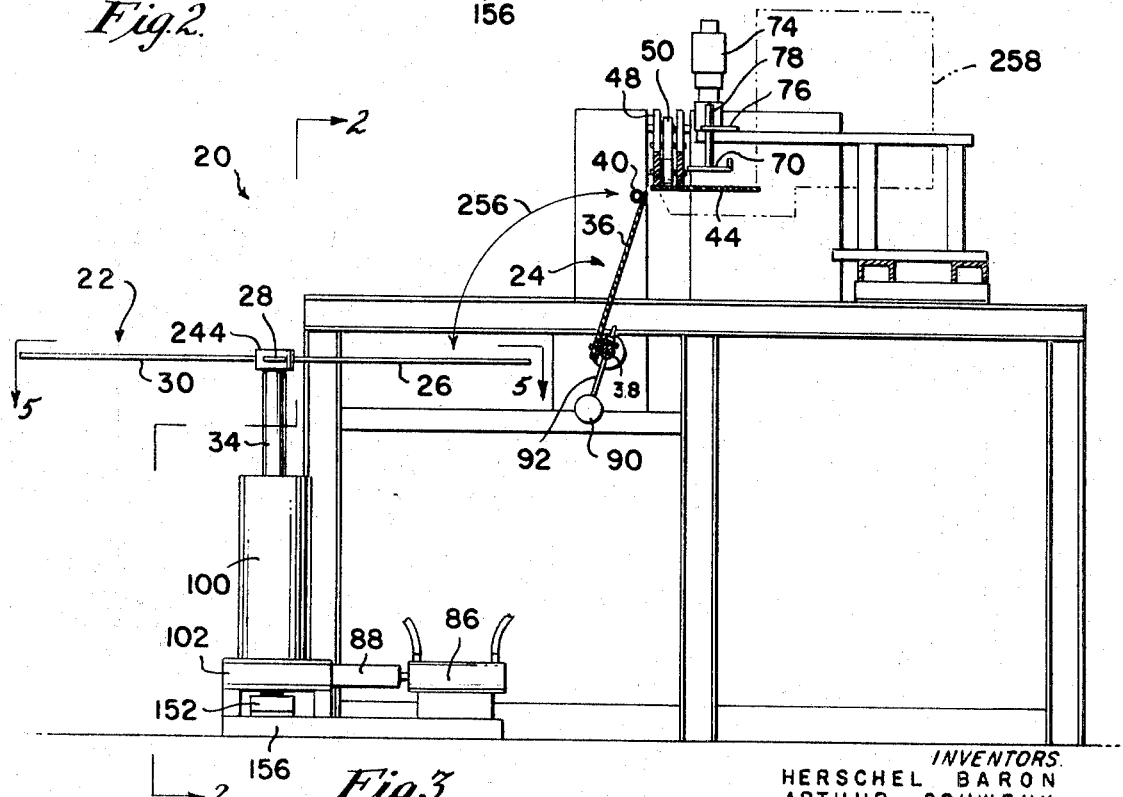
FIG. 3 is a side elevational view taken along the line 3-3 in FIG. 2.

The doffing gate 24 is best seen in FIG. 1, 3 and 4. The doffing gate basically includes, in addition to screen 36, shaft 38 and counterweight 90, an L-shaped rail 246 which is secured to the shaft 38. The L-shaped rail 246 includes a plurality of openings in its first leg 248 in which threaded fasteners 250 are utilized to secure screen 36 and the rail to the shaft 38.

Openings are also provided in leg 252 of the rail through which rods 92 extend. Nuts 253 are threadedly secured to rods 92 which support counterweight 90. Counterweight 90 provides a balance of weight about each side of the shaft 38 to facilitate rotation of the doffing gate when an article is being transported from the deck 44 of the automatic sewing assembly to the turnstile 22. The vacuum tube 40 extends and is secured along the uppermost longitudinal edge of the screen 36 by a plurality of threaded fasteners 254 which extend through openings provided in the screen and are threadedly engaged in openings in tube 40. The openings 42 provided along the length of the tube enable the partial vacuum caused in the tube 40 to secure the flexible article to the doffing gate 24.

Figure 2:
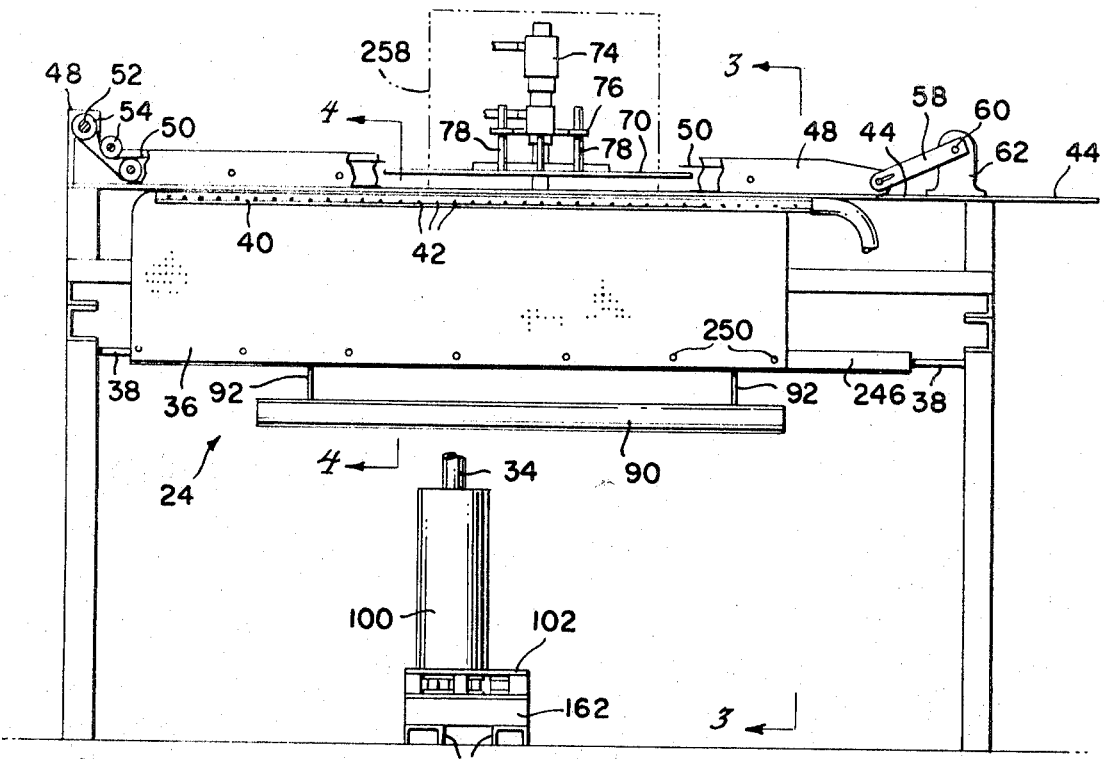
FIG. 2 is a front elevational view taken along the line 2-2 in FIG. 3 with portions removed for purposes of clarity.

As best seen in FIGS. 2 and 3, the doffing gate 24 is so positioned with respect to the deck 44 of the automatic sewing assembly that the screen 36 extends upward to and adjacent the edge of the deck 44 below belt housing 48. When an article travels in the direction of arrow 94 in FIG. 1, the part of the article that is to be sewn continues on the extension of deck 44. However, the remaining portion of the article falls into the open portion 46 of the deck 44. Thus, the article is draped over the screen 36 of the doffing gate as it is being sewn by a sewing machine adjacent to the sewing clamp 70.

The doffing gate 24 travels in the directions of arrows 256 in FIG. 3. Thus, when solenoid 80 (FIG. 1) is energized and causes the rack 82 to be moved inwardly of the automatic sewing assembly, the doffing gate 24 moves counterclockwise as seen in FIG. 3. As set forth hereinabove, prior to the solenoid 80 being energized, the partial vacuum is formed in tube 40 to enable a suction force to secure the article to the screen 36. The solenoid 80 is not energized until after the sewing clamp 70 is lifted after the last sewing operation on the article.

The overall operation of the stacker embodying the invention is set forth below.

Initially, the screen 36 of the doffing gate 24 is in the position shown in FIGS. 1, 2 and 3. The belt housing 48 is in the position shown in FIG. 3 and the sewing clamp 70 is in its uppermost position similar to that shown in FIG. 3.

When an article is moved along deck 44 in the direction of arrow 92 (FIG. 1), the belt 50 engages the article and draws it beneath the sewing clamp 70 adjacent to the sewing machine heads which are shown in phantom at 258 in FIGS. 2 and 3. As the belt 50 draws the article to the various positions in which it is to be sewn, the sewing clamp 70 is lowered to position the article for sewing. After the sewing clamp 70 has been lowered for the last time with respect to the article being sewn, the belt housing 48 is caused by the controls in the system to be lifted by energizing the solenoid-operated air cylinder 66. The crank lever 64 is drawn towards the cylinder 66 causing the shaft 60 and the lift lever 58 to be rotated clockwise as shown in FIG. 1. The housing 48 is thus lifted. Simultaneously, reduced pressure is provided via pipe 42 to tube 40 to cause a partial vacuum therein which causes a sucking action through the openings 42 to secure the garment to the upper edge of the screen 36 of the doffing gate 24. The sewing clamp 70 is then lifted after the last sewing operation is completed thereby freeing the article from the deck. Simultaneously, the solenoid 80 is energized thereby causing the rack 82 to rotate the pinion 84 and thereby cause the doffing gate to be rotated counterclockwise as seen in FIG. 3.

As the doffing gate pulls the article clear of the belt housing 48, cylinder 66 is again operated to cause crank lever 64 to be rotated counterclockwise as seen in FIG. 1. This action causes the belt housing 48 to be lowered again and start drawing the next article in the direction of arrow 92 towards the sewing machine head. As the doffing gate 24 gets to the bottom of its stroke, the reduced pressure is disconnected from the tube 40 thereby enabling the doffing gate to release the article on top of the arm 26 of the turnstile 22.

After the suction has been turned off, the solenoid-operated cylinder 80 causes the rack 82 to be drawn towards the cylinder thereby causing the pinion 84 and the shaft 38 to rotate the doffing gate 24 to the position shown in FIG. 2.

When the doffing gate is moved to its uppermost position adjacent the deck 44, it is positioned properly for enabling the next article to be draped thereover as the article has the final sewing operations performed thereon. After the final article of a batch has been sewn, the last article of the batch is placed onto an arm of the turnstile. As the doffing gate 24 is returned to its normal position adjacent deck 44, solenoid 86 is energized causing the ram 88 to be moved in the direction of arrow 236 (FIG. 11) thereby causing the index wheel 166 to be rotated 90°. The roller 178 which is closest the tongue 218 is drawn to the position shown in FIG. 11 by the tongue 218. The pin 190 is then urged into the next detent 182 to cause the index wheel to remain in place. The solenoid 86 is then caused to initiate movement of the ram 88 in the reverse direction of arrow 240 as shown in FIG. 12 causing the ram to resume its normal position as the tongue 218 passes underneath the roller 178 which is next caused to be moved.

The rotation of the index wheel 90° causes the arms 26 through 32 to be rotated by shaft 34 90°. Thus, where the previous batch had been placed on arm 26, the arm 32 is then moved by the movement of the index wheel 166 to the position facing the screen 36 of the doffing gate 24. The doffing gate thus causes the next batch of articles to be piled on the next arm of the turnstile 22.

It can therefore be seen that a new and improved stacker has been provided. The stacker embodying the invention is both space saving and inexpensive to produce. It enables a time-sharing operation in which one arm of the turnstile may be used to receive a first batch of articles which are finished by an automatic sewing assembly while the other three arms may be used for either storage or unloading of the previous batches which have been produced.

The stacker enables continuous operation so that after a batch of articles has been produced, the machine need not be stopped until the batch that has been completed has been removed. Moreover, in addition to removing a batch from the output area of the automatic sewing machine, the stacker provides a storage facility for an operator so that the machine may be unloaded after two or three batches have been produced rather than having to keep an operator at the machine continuously to remove batches after each batch is completed.

Without further elaboration, the foregoing will so fully illustrate my invention that others may, by applying current or further knowledge, readily adapt the same for use under various conditions of service.

What we claim as our invention is:

1. A stacker for flexible articles successively presented to an output station, said stacker comprising a support member for said articles and a movable member for transporting said articles from said station to said support member, said movable member being planar and elongated and being pivotable about a horizontally disposed axis so that said articles are transported by pivoting said movable member, a means for producing suction being provided on said movable member so that said articles are secured to said movable member as said movable member transports said articles, said support member comprising a plurality of elongated members and a vertically extending shaft, said elongated members extending radially and perpendicularly from said shaft, said shaft being rotatable so that after a predetermined number of articles have been draped by said movable member on one of said arms, said shaft is rotated to present another one of said members to support the next article transported by said movable member to said support member.

2. The invention of claim 1 wherein said suction means comprises a perforated tube which is disposed at the outermost edge of said movable member from said axis, said tube being connected to a source of reduced pressure to cause suction.

3. The invention of claim 1 wherein said movable member is perforated.

4. The invention of claim 3 wherein said movable member further includes a counterweight which is disposed diametrically opposite said perforated portion about said horizontally disposed axis.

5. A stacker for flexible articles successively presented to an output station, said stacker comprising a support member for said articles and a movable member for transporting said articles from said station to said support member, said movable member being planar and elongated and being pivotable about a horizontally disposed axis so that said articles are transported from said station to said support member by pivoting said movable member, with said movable member being positioned adjacent said output station so that said articles are draped over said movable member when placed in said output station, said support member comprising a plurality of elongated arms and a vertically extending shaft, said arms each being secured to said rotatable shaft, said arms being so disposed that one of said arms faces said movable member, said shaft being rotated after a preselected number of articles are placed on said arm facing said movable member so that a different one of said arms faces said support member, said movable member having means for producing suction with said suction means comprising a perforated tube which is disposed along the outermost edge of said movable member from said axis, said tube being connected to a source of reduced pressure to cause suction, said suction means acting to secure said articles to said movable member as said movable member transports said articles.

6. The invention of claim 5 wherein four arms are provided, each of which is spaced 90° from the closest adjacent arms about the periphery of the shaft.

7. The invention of claim 6 wherein an indexing member is providing having detents for causing the rotation of said shaft to be stopped at 90° intervals.